United States Patent Office 2,746,940
Patented May 22, 1956

2,746,940

PRODUCTION OF CELLULAR POLYVINYL PLASTICS

Alfred Cooper and Leonard Baxter MacQueen, Croydon, England, assignors to Expanded Rubber Company Limited, Croydon, England, a British company No Drawing. Application September 21, 1951, Serial No. 247,775

Claims priority, application Great Britain September 27, 1950

2 Claims. (Cl. 260—2.5)

This invention relates to the production of cellular materials consisting of polyvinyl plastics, by which is meant for the purpose of this specification, polyvinyl chloride and co-polymers of vinyl chloride with vinylidine chloride and/or acetate or any mixtures of these or mixtures thereof with butadiene-acrylonitrile co-polymers. The present invention relates in particular to the production of cellular materials from such plastics by a process involving expanding a dough by forming gas bubbles therein against an external pressure on reduction of which the cells are formed in the dough.

The methods of forming cellular materials by gas-expanding a dough are now well known in the rubber and plastic arts. They fall generally into two classes, namely those in which the dough is submitted to treatment with an inert gas under high pressure in a pressure vessel such as an autoclave at room temperatures or elevated temperatures, so that the dough becomes impregnated with the gas, and on reduction of the external pressure the material expands by the formation of gas bubbles. The other methods involve dispersing in the dough a so-called blowing agent which, at an elevated temperature, will volatilise, react, or decompose to release a gas and thus form the cells. Substances of the latter type are generally preferred as blowing agents and include such substances as azo-isobutyric acid dinitrile, benzosulphohydrazide, and diazoamino benzene.

In the treatment of rubber a dough is easily formed by masticating the unvulcanized rubber, which can be later strengthened sufficiently to retain the gas in the cells by vulcanization to either the soft elastic form or the rigid ebonite form. In the case of plastics such as polyvinyl chloride, however, it is necessary to form the hard material into a dough which is capable of being impregnated with a gas by one of the above described methods and then rendered sufficiently hard or rubbery to retain the gas in the cells when formed. This was effected in the process described in Patent No. 2,447,056 by heating a paste of the polymer and a plasticiser which has no appreciable solvent or swelling action thereon at normal temperatures, but swells it and forms a gel at elevated temperatures, and after the usual gassing operations the gel was hardened by further heating in order to enable it to retain its cellular formation. The product obtained according to this prior process is a soft-expanded polyvinyl chloride or co-polymer thereof analogous in its physical properties to soft-expanded rubber.

In order to produce hard cellular polyvinyl plastics it was proposed in Patent No. 2,447,055 to produce the necessary dough by heating the monomeric polyvinyl compound or a low polymer which is still liquid until a rubbery consistency was produced which, after the usual gassing operations, could be hardened by further polymerisation.

Another method of producing hard-expanded polyvinyl plastics was described in British patent application Serial No. 657,338, according to which the dough was formed by employing as plasticising solvent one which is volatile at room temperatures or slightly elevated temperatures, and after the usual gassing operations the plastic was hardened by the removal of the plasticising solvent.

The removal of the plasticising solvent in the process above referred to is, however, a costly operation, taking time and being also uneconomical in the wastage of solvent. Moreover, the hardness of the final product depends to some extent on sufficient solvent removal, which is not easy on account of the relatively small quantities of solvents used.

It has now been found that it is possible to use certain types of polymerisable solvents as temporary plasticisers which have the effect of rendering the paste plastic prior to expansion. When the mix is subsequently heated, either in a mould or else in the press or in a hot air oven or other heating device, any solvent or plasticiser remaining in the plastic is polymerised more rapidly than a volatile solvent could be removed so that the remnants of plasticiser remaining in the plastic contribute to the hardness rather than causing the final product to be insufficiently hard and the polymerised solvent or plasticiser becomes part of the hard-expanded plastic composition, giving it improved properties.

According to the present invention, in a process for the production of a hard cellular polyvinyl plastic as hereinbefore defined, the invention consists in the formation of a dough by heating a paste of the polymer and a temporary plasticiser consisting of a polymerisable solvent, and after the usual gassing operation and completion of the expansion, heating the cellular product until any residual solvent is polymerised.

In carrying out the process according to the invention, a volatile non-polymerisable solvent may be employed in addition to the polymerisable solvent, and it is found that by thus employing a volatile solvent a lower density in the final product can be attained.

Suitable polymerising solvents are styrene and substituted styrenes. In this connection it is known that a substituent in the nucleus gives a material with approximately the same polymerisation characteristics as the styrene itself, whereas substituents in the ethylene side chain give a much slower or less pronounced polymerisation. Thus, ortho-methyl and para-methyl styrene polymerise more quickly than styrene itself, whereas alpha-methyl styrene polymerises slower. Other polymerisable styrene derivatives, for example, are the orthometa- and paraisomers and methoxy styrene. In order to arrive at correct expansion conditions, it may be desirable to add by way of adjustment and to prevent premature polymerisation of the solvent, an inhibitor. Polymerisation inhibitors are well known to those concerned with polymer chemistry. Hydroquinone is most commonly used but many similar substances such as catechol and tertiary butyl catechol are used for this purpose. Those skilled in the art will have no difficulty in adjusting the amount and type of inhibitor to give the correct conditions allowing time for the necessary manipulations and for the correct conditions to obtain during the formation of the gas bubbles. Other polymerisable solvents which may be employed for the purpose of the invention include methyl or butyl methacrylate; these monomers have a rather faster polymerisation rate and for the purpose of this invention require more inhibitor to obtain the correct expansion conditions. Resinous materials which are obtained by polymerising styrene in the presence of acrylic esters, acrylonitriles, and other co-polymers of styrene which are less brittle than styrene itself, may also be employed. Furthermore, acrylic acid and its derivatives have the further advantage that they may be co-polymerised in acetone solution, acetone being a suitable volatile solvent which may be employed in co-operation with the polymerisable solvent. In this way substances such as ethyl acrylate and vinyl acetate co-polymers may be formed in the material in situ.

Many other polymerisable temporary plasticisers may be employed for carrying out the invention provided that the polymerisation rate can be adjusted by suitable means to the gelation rate of the polyvinyl chloride, the amount of inhibitor required as a rough criterion being that which gives rise to the same gelation time for the mixture as would be required for a simple polyvinyl chloride and acetone mixture.

The invention will be further illustrated with the aid of the following specific example:

100 grams of polyvinyl chloride as sold under the registered trademark "Geon 121 polymer" and 15 grams of azoisobutyric acid dinitrile and 15 grams of lead stearate are mixed together. The lead stearate is required as stabiliser for the polyvinyl chloride. The mixture was ball milled for a period of 1½ hours and was then transferred to an internal mixer of the Baker-Perkins type, and 95 mls. of a mixture of 100 mls. acetone, 100 mls. styrene and 9 grams of hydroquinone were added and thoroughly dispersed. The resulting paste was transferred to a suitable mould and given a heating cycle of 12 minutes at 164° C. (i. e. with steam heating 85 lbs. per square inch steam pressure), followed by circulating cold water through the press until perfectly cold (the duration of this cycle depends in part on the dimensions of the mould and on the type of press used). The hydraulic pressure applied to the sample during the heating cycle was 1 ton per square inch.

After cooling the press the blank was removed from the mould and expanded for 30 minutes in a water bath at 80° C. It was then dried off in an oven at 200° F. until sufficient hardness was obtained by evaporation of the acetone and polymerisation of the styrene. A uniformly expanded white product was obtained having a density of 3.4 lbs. per cubic foot.

We claim:

1. A process for the production of hard cellular products from a polyvinyl type plastic selected from the group consisting of polyvinyl chloride, co-polymers of vinyl chloride with vinyl acetate, co-polymers of vinyl chloride with vinylidine chloride and mixtures of at least one of said co-polymers with butadiene acrylonitrile co-polymer, which process comprises in combination the following steps: (a) heating in a confined space a paste consisting of the powdered vinyl polymer, a polymerizable solvent selected from the group consisting of styrene, alkyl substituted styrenes in which the substituent is in the nucleus, methyl methacrylate and butyl methacrylate, and a blowing agent which at the temperature of gel formation will form an inert gas, and continuing the heating until the paste is converted into a gel; (b) cooling until the gel sets to a hard mass; (c) re-heating the mass without applied pressure until it is softened and expanded under the influence of the gas with which it is impregnated, and continuing the heating until the mass is hardened by polymerisation of the polymerizable solvent.

2. A process for the production of hard cellular products from a polyvinyl type plastic selected from the group consisting of polyvinyl "chloride," co-polymers of vinyl chloride with vinyl acetate, co-polymers of vinyl chloride with vinylidine chloride and mixtures of at least one of said co-polymers with butadiene acrylonitrile co-polymer, which process comprises in combination the following steps: (a) heating in a confined space a paste consisting of the powdered vinyl polymer, styrene and azoisobutyric acid dinitrile, and continuing the heating until the paste is converted into a gel; (b) cooling until the gel sets to a hard mass; (c) re-heating the mass without applied pressure until it is softened and expanded under the influence of the gas with which it is impregnated, and continuing the heating until the mass is hardened by polymerisation of the styrene.

References Cited in the file of this patent
FOREIGN PATENTS 967,782    France _____ Nov. 10, 1950

OTHER REFERENCES

Ellis: "Chemistry of Synthetic Resins," vol. I, page 242, New York, 1935.